(12) United States Patent
Mazzini (10) Patent No.: US 11,371,424 B1
(45) Date of Patent: Jun. 28, 2022

(54) PISTON EXTERNAL PIN BOSS, LONGER COMBUSTION TIME, AND POWER CONTROL VALVE

(71) Applicant: Jose Oreste Mazzini, Lima (PE)

(72) Inventor: Jose Oreste Mazzini, Lima (PE)

( * ) Notice: Subject to any disclaimer, the term of this patent is extended or adjusted under 35 U.S.C. 154(b) by 0 days.

(21) Appl. No.: 17/386,754

(22) Filed: Jul. 28, 2021

(51) Int. Cl.
| F02B 25/02 | (2006.01) |
| F02B 75/28 | (2006.01) |
| F02B 75/02 | (2006.01) |
| F16J 1/16 | (2006.01) |
| F02B 75/04 | (2006.01) |

(52) U.S. Cl.
CPC ............ F02B 75/282 (2013.01); F02B 75/02 (2013.01); F02B 75/045 (2013.01); F16J 1/16 (2013.01); *F02B 2075/025* (2013.01)

(58) Field of Classification Search
CPC ........ F02B 75/282; F02B 33/30; F02B 75/28; F02B 75/32; F02B 25/08; F02B 33/12; F02F 3/28; F02F 3/027; F02F 7/0019; F01B 7/02; F01B 7/08; F16C 2226/62
See application file for complete search history.

(56) References Cited

U.S. PATENT DOCUMENTS

| 1,799,511 | A | * | 4/1931 | Greening | ................ | F01L 11/04 |
| | | | | | | 123/47 R |
| 3,139,074 | A | * | 6/1964 | Winn | ..................... | F02B 75/28 |
| | | | | | | 123/51 BC |
| 3,797,467 | A | * | 3/1974 | Tenney | .................... | F02B 25/00 |
| | | | | | | 123/73 AA |
| 4,010,611 | A | * | 3/1977 | Zachery | ..................... | F01B 7/14 |
| | | | | | | 60/516 |
| 4,375,792 | A | * | 3/1983 | Barret | ....................... | F01B 7/14 |
| | | | | | | 123/197.4 |
| 4,625,688 | A | * | 12/1986 | Takayasu | ................ | F02B 33/04 |
| | | | | | | 123/73 B |
| 5,042,441 | A | * | 8/1991 | Paul | ...................... | F02B 75/225 |
| | | | | | | 123/276 |
| 5,054,457 | A | * | 10/1991 | Sakamoto | ............... | F02B 33/04 |
| | | | | | | 123/533 |
| 5,373,820 | A | * | 12/1994 | Sakamoto | ........... | F02M 69/045 |
| | | | | | | 123/295 |
| 5,823,150 | A | * | 10/1998 | Konakawa | ............. | F01L 3/205 |
| | | | | | | 123/73 V |

(Continued)

*Primary Examiner* — George C Jin
*Assistant Examiner* — Teuta B Holbrook
(74) *Attorney, Agent, or Firm* — Mariana I. Vernieri (57) ABSTRACT

A piston with external pins boss connected with at least two coupled crankshafts, transforming reciprocating linear movement of the piston into rotary motion of the crankshafts. A cylinder jacket with the piston head forms the combustion chamber. Piston inner space with static counterpart forms an additional intake-breathing chamber. On static counterpart, an income and outgo valves can be located. From reciprocating movement of the piston, the intake-breathing chamber will provide intake gases to the combustion chamber employing a transfer port. Previous to the transfer port, a control valve may be disposed to regulate the volume of intake gases entering the combustion chamber. The intake-breathing gases not used for combustion may be mixed with combustion exhaust gases. Length of connecting links, on inverse configuration, provides extra time at maximum compression rate; improving evaporation and combustion stage timing.

3 Claims, 6 Drawing Sheets

(56) References Cited

U.S. PATENT DOCUMENTS

| | | | |
|---|---|---|---|
| 6,959,672 B1* | 11/2005 | Peng | F02B 71/00 |
| | | | 123/46 R |
| 7,156,056 B2* | 1/2007 | Lemke | F02F 1/186 |
| | | | 123/41.35 |
| 7,546,819 B2* | 6/2009 | Lemke | F02B 75/282 |
| | | | 123/41.35 |
| 2002/0139326 A1* | 10/2002 | Araki | F02M 35/10078 |
| | | | 123/73 PP |
| 2004/0035377 A1* | 2/2004 | Arao | F02B 71/00 |
| | | | 123/73 C |
| 2015/0260083 A1* | 9/2015 | Kurata | F02B 25/22 |
| | | | 123/73 R |
| 2016/0090900 A1* | 3/2016 | Pirault | F02B 75/18 |
| | | | 123/51 BA |

* cited by examiner

PISTON EXTERNAL PIN BOSS, LONGER COMBUSTION TIME, AND POWER CONTROL VALVE

BACKGROUND OF THE INVENTION

The present invention relates a coupled crankshaft, each one with an individual link to each pin boss on the external surface of the same piston. The inner cylindrical space of the piston provides another chamber for intake gases; these gases are conducted to the transfer port of cylinder combustion chamber. A valve can be disposed of previous to transfer port for power control of Otto cycle, reducing throttle losses and may additionally oxygenize exhaust gases. Connecting rod length and inverse configuration gives an extra rotational angle of crankshafts at maximum compression rate. Piston dual chamber (intake-breathing chamber and combustion chamber) plus frictionless linear movement, plus extra time at TDC maximum compression, plus power valve control, give this mechanism a novelty, for example to the two-stroke engines. Many two-stroke engines are simple and economic, with no refine components as intake and exhaust valves, nor valve train mechanism and one combustion per revolution; the great problem of this mechanism is that the inner part of the piston is compromised with the piston pin boss and the connecting rod movement. Indirect use of this normal inner piston with crankcase involved the presence of oil and high contamination that makes this simple-economic mechanism inappropriate. More complex mechanism with oil pump avoiding the mixture of oil with fuel plus the fuel injection inside the combustion chamber avoiding fresh air/fuel going out with the scavenged gases helps reducing contamination but it isn't sufficient.

Recent developments are CITS two-stroke engine (Crankcase Independent Two Stroke) with 2010 U.S. Pat. No. 8,683,964. JJS2 Polish two-stroke engine with patent # PL 204724 B1. In 2015 opposed piston diesel engines done by companies AchatesPower and Fairbanks Morse Engine achieved highly efficient cycles. In 2019 patent #10309448 from Neander Motor A.G. where piston with two pins is connected to two counter rotation crankshafts.

Meanwhile opposed piston, face-to-face, provides a good balance with no combustion heads and fewer heat losses; but they still depend from external compress intake gases components like additional reciprocating piston plus valves (for only intake-breathing stage) or supercharger and/or turbocharger giving an incremental cost and complexity to the overall engine.

This invention is useful even in these last decades of generalized fossil fuel combustion, for example, in small utility engines, small motorcycles and tools, reducing actual exhaust gases contaminants. Also, for marine engines, less weight and maintenance. In hybrid systems combining an electric motor with internal combustion engines is also a very useful system with overall low maintenance as well, lowest manufacture cost because of the increment combining two power sources and technologies. The major efficiency of the electric engine is that they have a dual function, as an electric motor as well as an electric generator. This provides kinetic energy recovery that no combustion engine can normally do (freewheel kinetic accumulator or KERS). Meanwhile vehicles at a steady speed, the energy consumption is mainly by the air resistance and the friction of the components, these have no possibility of recovery; so electric motor and the clean-efficient combustion engine are equally valid. In other words, an excellent mechanism-engine to be considered.

BRIEF SUMMARY OF THE INVENTION

Two coupled gears 15 (pair number of gears) for counter rotating crankpins 23 and 25, each one has a connecting rod 4 where its extremes are connected to each lateral piston pin boss 21a and 21b of a shared piston. Each piston pin boss 21a and 21b of piston 1 has an offset distance 3 parallel to its linear movement with the centerline of each crankshaft 40a and 40b for reducing the extension of lateral arms 2. The inside surface 11 of piston 1 with static sealing component 12 forms the breathing chamber 34; where the static sealing component contains income valve 9, and outgo valve 10. The reciprocating movement of piston generates the intake breathing volumetric airflow 30 flow where its volumetric efficiency is incremented by disposing of income 9 and outgo 10 valves on the nearest position to the breathing chamber 34. A control valve 17 can be disposed, of for the Otto cycle, reducing throttle losses and providing excess intake gases 29b to the exhaust gases 6; meanwhile, full intake-breathing gases cool the piston inside surface 11. Piston outside surface combined with cylinder walls make the combustion chamber 33, where admission, compression, evaporation, combustion, expansion, and exhaust stages take place. Cylinder 5 contains extremes ports for transferring intake gas (port 8) and expelling exhaust gases. In the cylinder head, a conventional exhaust valve 18 can also be disposed of for incrementing the exhaust efficiency; meanwhile, a valve mechanism must be considered for this case. Previous to intake-transfer port 8, a fuel injector can be located. On maximin compression position, spark plugs and/or fuel injector 7 can also be located at the cylinder head.

The object, of the invention is to provide a novel mechanism that, for example, can be use on combustion engines providing: First an oil-free breathing chamber 34, second to provide extra time for fuel evaporation and combustion process and the third object is to obtain a power control valve for Otto cycles, reducing throttle restrictions and mixing part of intake gases with exhaust gases. The other objects and features of this invention will become understood from the following description with reference to the accompanying drawings.

BRIEF DESCRIPTION OF THE SEVERAL VIEWS OF THE DRAWINGS

FIG. 1 is a cross-sectional view showing of a single piston 1 with piston pin boss 21, linked to connecting rods 4a and 4b which are also linked to two crankshafts 40a and 40b respectively that are counter rotating by means of gears 15. Offset 3 or parallel distance between linear piston pin movement with the centerline of the crankshaft 40a or 40b. Intake-breathing volumetric airflow 30 is introduced by means of the breathing chamber 34 which is confined by the inside surface 11 of the piston 1 and sealing component 12 that contains income valve 9, with outgo valve 10. Income valve 9 and outgo valve 10 are in the nearest position to the breathing chamber 34. Control valve 17 for Otto cycle helps lowering throttle restrictive losses and excess intake gases 29b provides additional oxygen to exhaust gases. Cylinder walls 5 with the cylinder head 16 and piston 1 make the combustion chamber 33. Cylinder extreme ports, 8 for intake gases and for exhaust gases 6. On TDC zone, spark plugs and/or fuel injector 7 are located. For adjusting manufacture uneven length and position, eccentrics bushings or shells 26, 27 may be installed.

FIG. 3 is a cross-sectional view of an opposed piston, face-to-face, showing an embodiment of the symmetrical-link mechanism of the invention. Piston 1 with lateral arms 2 and piston pin boss 21, where pins are linked to two counter rotating coupled crankpins 23 and 25, each one is linked with connecting rods 4a and 4b or 32a and 32b respectively. Symmetrical piston 31, with lateral arms 2, pins boss 20 linked, to two counter rotating coupled crankpin 22 linked with connecting rod 32b, crankpin 24 linked with connecting rod 32a, crankpin 23 linked with connecting rod 4a and crankpin 25 linked with connecting rod. Offset distance 3 from linear piston pin movement to parallel centerline of the crankshaft 40a or 40b. The breathing chamber 34 is confined by inside surface 11 of the piston 1 and static sealing component 12 where income valve 9 with outgo valve 10 are located. Cylinder walls 5 with opposed face-to-face identical pistons make the combustion chamber 33. Intake-breathing volumetric airflow 30 by each piston is conducted to cylinder opposite transfer ports 8 and, after combustion, to exhaust port 6a, where exhaust gases 6 mixed together with excess intake gases 29b, which are the portion of the intake-breathing volumetric airflow 30 not entering said combustion chamber 33, are released. On the nearest position of both pistons 1 and 31 heads, spark plugs, and/or fuel injectors 7 are located.

FIG. 4 is another cross-sectional top view of two combustion chambers 33 and explicit counter rotation crankshafts 40a and 40b. Crankshafts 40a and 40b are coupled by gears 15. The top view shows opposite transfer passages and crankpins configuration. The bottom view shows a piston with lateral arms ready to be connected on each crankshaft 40a and 40b; connecting rods are not shown for simplicity. Both cylinders show transfer ports 8 from each piston in the opposite position. Where on one piston its piston pin boss 21a is linked to crankpin 23 and its other piston pin boss 21b is linked to crankpin 25 meanwhile, the crankpin 22 and crankpins 24 are for the link with the other piston.

FIG. 5 shows a graph of compression ratios vs crankshaft rotation angle. Three curves are plotted: A) Almost sinusoidal type for very long connecting rods (Sinusoidal, the intermediate curve) B) Shorter length (on the graph, rod length equals 1.5 times the crankshaft diameter) of connecting rod on traction or inverse position as normal reciprocating engines (Opposite+offset, the widest curve) C) Same connecting rod length but on compression or regular configuration (Traditional, the narrowest curve).

FIG. 6A is a cross-sectional view showing a single piston with connecting rods on the traditional layout which is compression mode; reverse of FIG. 1. Gears 15 generating counter rotation of two crankshafts 40a and 40b, crankpins 23 and 25 are linked to the piston by means of connecting rods 4a and 4b respectively. In this example, cylinder head 16 contains an exhaust valve 18 (valve mechanism not shown) for improving scavenging gases. For Otto cycles, valve power control 17 helps lowering throttle losses and excess intake gases 29b is conducted to help to scavenge exhaust gases with additional oxygen for post-combustion, reducing combustion residual contaminants. Previous to transfer port 8 is located as an example a fuel injection 19. Cylinder walls 5 with the cylinder head 16 and the piston 1 makes the combustion chamber 33. Near TDC a spark plug and/or fuel injector 7 is located.

DETAILED DESCRIPTION OF THE INVENTION

The inventor provides a unique piston with pins boss on its external sidewalls, linked to coupled counter rotating crankshafts for a reciprocating mechanism. A connecting rod on inverse configuration for extending piston timing at maximum compression zone and a valve for regulating-deviating the amount of gases flow. The present invention is described in enabling detail in the following examples, which may represent more than one embodiment of the present invention.

Figure 1:
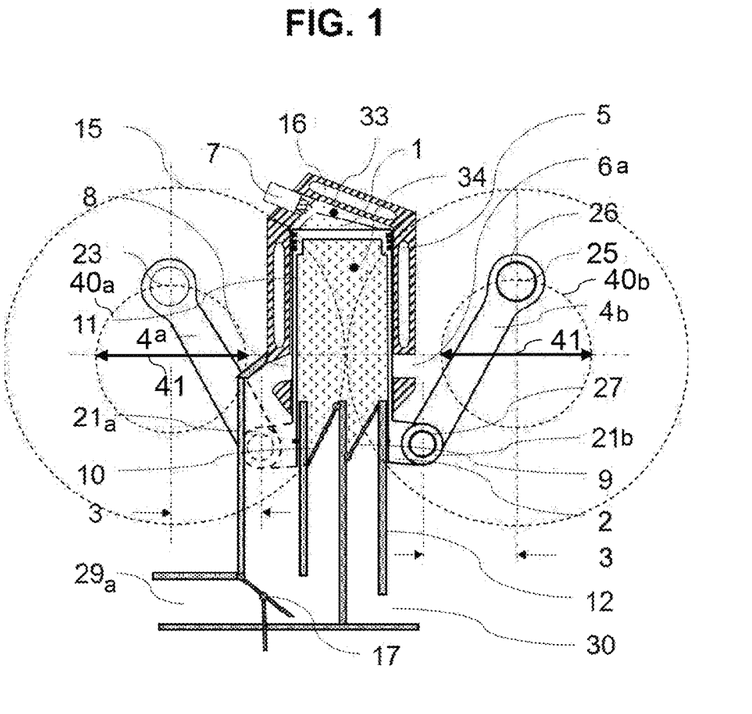

FIG. 1 is a cross-sectional view of piston, conrods disposition, and control valve on a Two Stroke engine according to this embodiment example of the present invention. A Piston 1 with a piston pin boss 21a on its external sidewalls linked to a coupled crankpin 23, each linked by a connecting rod 4a and 4b, converting linear piston movement to a counter-rotational of crankshafts 40a and 40b. Coupled crankshafts 40a and 40b are linked by gears 15. Reciprocating piston with an inside surface 11 confined with a static sealing component 12 that includes, in this example, an income valve 9 and an outgo valve 10, providing that all or a portion 29a of intake-breathing volumetric airflow 30 can flow into the combustion chamber 33 of the engine by means of a transfer port 8. The outer head surface of piston 1 with a cylinder wall 5 and a cylinder head 16, confine the combustion chamber 33 where combustion gases are expulsed by means of an exhaust port 6a. In the cylinder head, a fuel injector and/or spark plug 7 is included. For adjusting manufacture unevenness length or position, either or both, between crankshafts 40a and 40b and conrods, an eccentric bushing 26 or an eccentric bushing 27, either or both, may be installed.

A higher intake-breathing volumetric efficiency may be obtained when income valve 9 and outgo valve 10 are disposed at the nearest position to the breathing chamber 34. Income valve 9 and outgo valve 10 can have independent movement or be interconnected between them; more complex mechanism like rotary valves may be installed.

Fresh air in the inner chamber helps heat dissipation of the piston itself Cylinder wall 5 and static sealing component 12 provide additional linear guidance to the piston. At transfer port 8, a liquid fuel injector or compresses natural gas CNG supply may be disposed of Previous to this, a novel control valve 17 may be disposed of for power modulation of Otto cycles, reducing throttle restriction losses. Excess intake gases 29b not going through transfer port, may be mixed with exhaust gases 6. Two counter rotating coupled crankshafts 40a and 40b develops linear movement to the pistons with minimum sidewall friction. Combustion forces can also be shared between both crankshafts 40a and 40b. An offset 3 or distance between linear piston pin movement with the parallel centerline of the crankshaft 40a or 40b, provides a nonsymmetric displacement at maximum compression zone with a reduction of a piston length arms 2 improving component resistance.

Figure 2A:
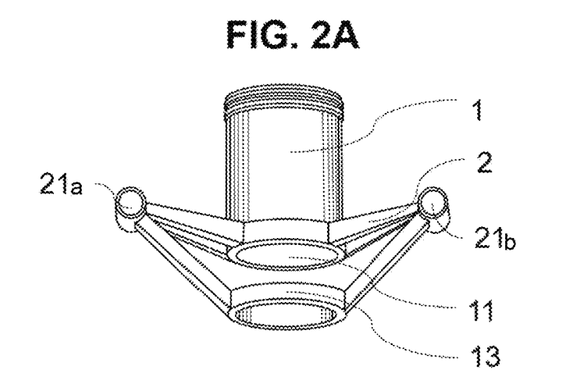
FIG. 2A Piston 1 schematic with piston pin bosses 21a and 21b, inside surface 11, lateral arms 2, with arms reinforcement 13.

FIG. 2A is a view of an example of piston 1, inside surface 11. Piston pins bosses 21a and 21b of the present invention contains a reinforcement arm 13 for the extended piston arms 2.

Figure 2B:
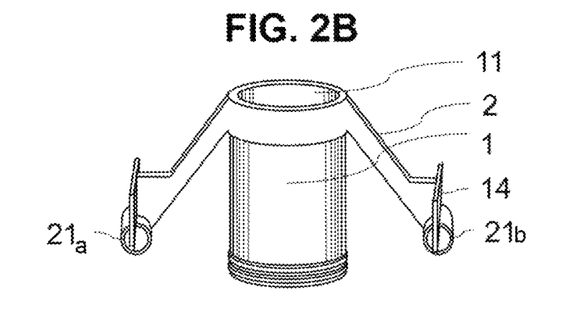
FIG. 2B Piston 1 schematic with piston pin bosses 21a and 21b, inside surface 11, lateral arms 2, with lateral plates for linear sliding guidance 14

FIG. 2B is a view of an example of piston 1, inside surface 11. Piston pin bosses 21a and 21b of the present invention contain a reinforcement sliding support 14 on piston arms 2.

Figure 2C:
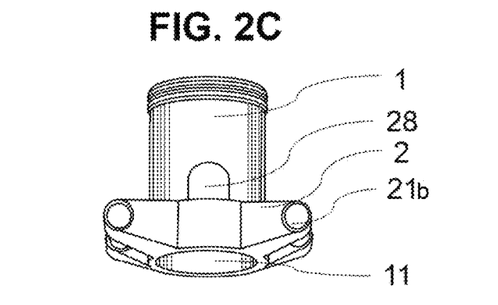
FIG. 2C Piston 1 schematic with almost, no lateral arms 2, inside surface 11, piston pin boss 21b, piston skirt opening 28 as lateral income valve.

FIG. 2C is a view of an example of piston 1, inside surface 11. Piston pins bosses 21a and 21b of the present invention with short piston arm 2, also containing a lateral opening 28 in piston skirt.

Figure 3:
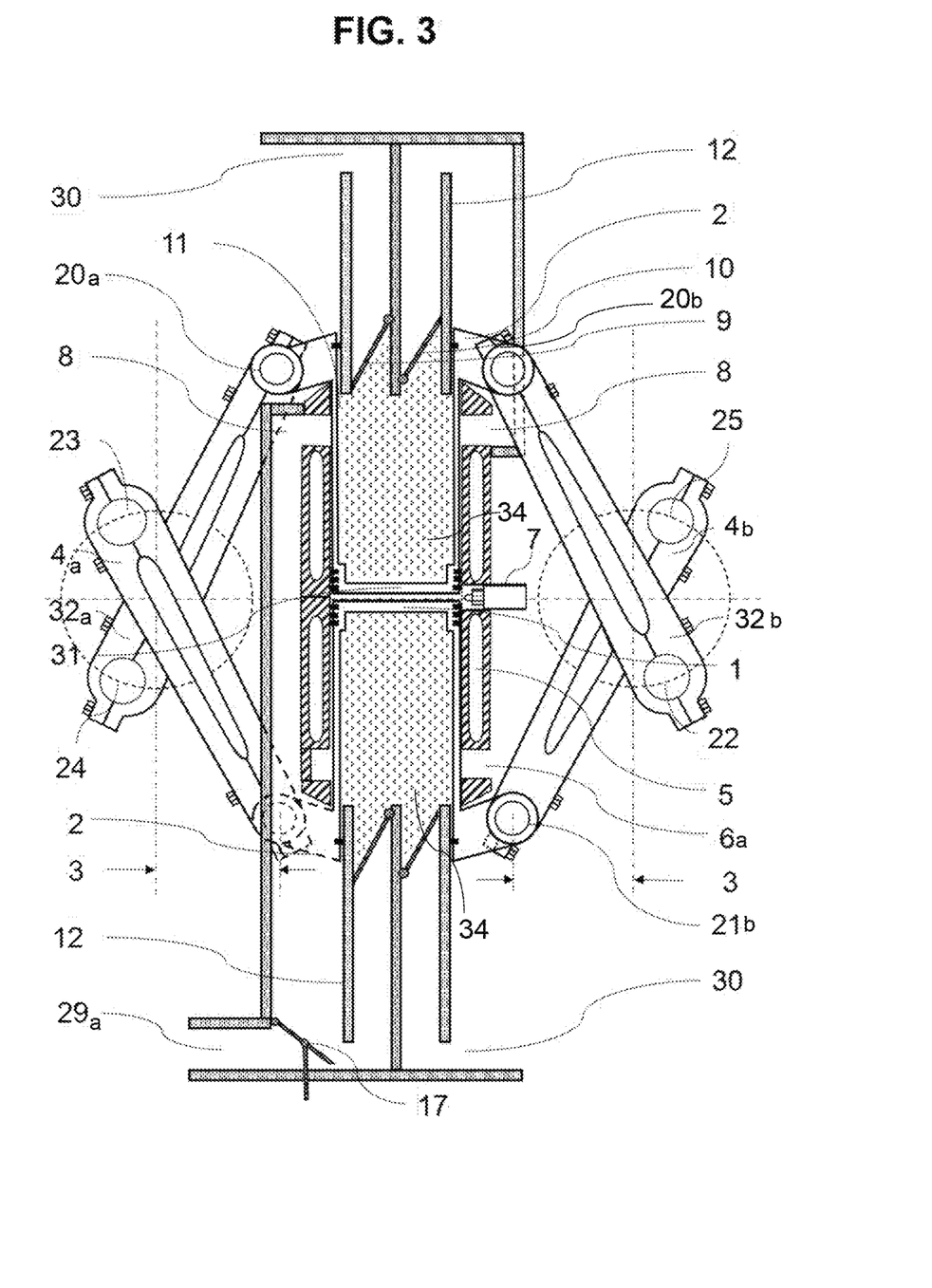

FIG. 3 is a cross-sectional view of an opposed piston, face-to-face, showing an embodiment of the symmetrical-link mechanism of the invention. The piston 1 contains lateral arms 2 and piston pins boss 21a, where one side pin is linked to connecting rods 4a and 4b (on traction mode), on which the other end is linked to crankpin 23; the other side piston pin boss 21b is linked to a pair of connecting rods 32a and 32b (also on traction mode), on which the other ends are linked to the pair of crankpins 25. A second piston 31 containing pin boss 20a, where one side pin is linked to connecting rod 32a, on which the other end is linked to crankpin 24 by connecting rod 32a; the other side pin boss 20b is linked to a connecting rod 32b, on which the other ends are linked to the pair of crankpins 22. Offset distance 3 from linear piston pin movement to parallel centerline of the crank shaft 40a or 40b. The breathing chamber 4 is confined by inside surface 11 of the piston 1 and sealing component 12, containing income valve 9 with outgo valve 10. Cylinder walls 5 with opposed face-to-face identical pistons make the combustion chamber 33. Intake-breathing volumetric airflow 30 from each piston is conducted to cylinder transfer ports 8, one in front of the other. Cylinder exhaust gases are released on port 6a. On the nearest position of both pistons 1 and 31 heads, a spark plug and/or a fuel injector 7 is included. Control valve 17 may be disposed of for power modulation of Otto cycles, reducing throttle restriction losses. Excess gases 29b, may be mixed with exhaust gases 6.

Figure 4:
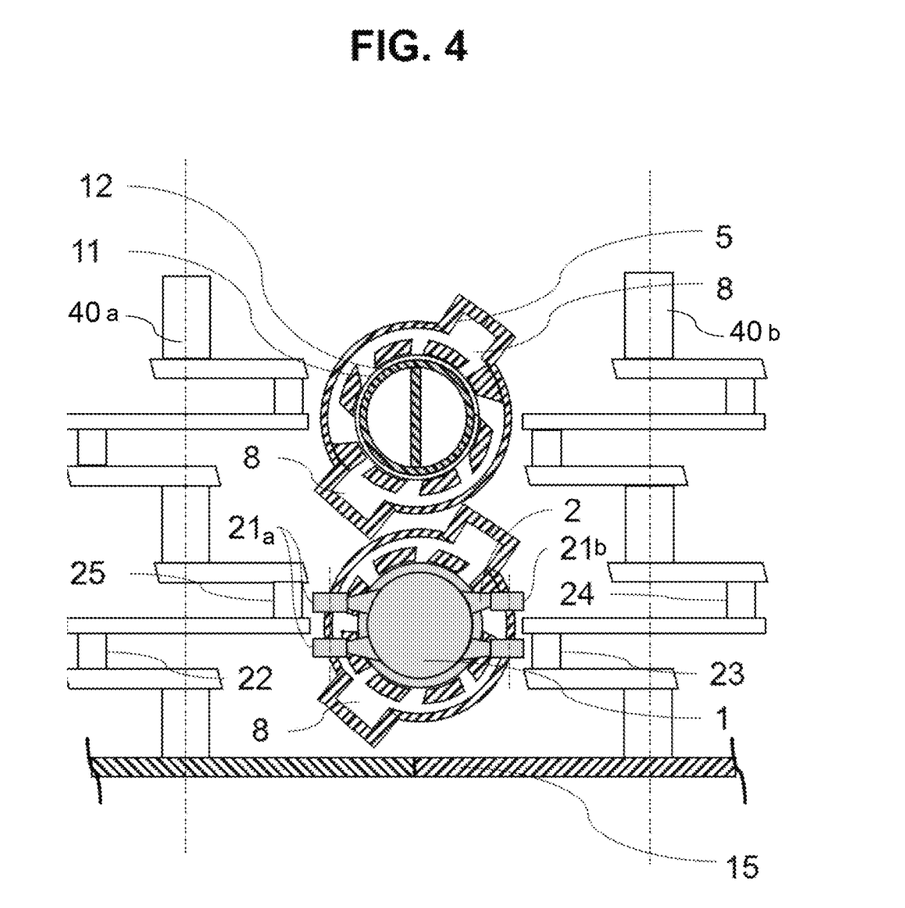

FIG. 4 is an example of the opposite piston configuration of the embodiment of FIG. 3. In the sectional top view, transfer port 8 from each piston intake-breathing is located one in front of the other according to an embodiment of the present invention; by this, may provide fewer intake gases resistance and increase of the swirl flow entering the combustion chamber 33. Including in this a top view, the inside surface 11 and static sealing component 12 are shown.

In sectional bottom view, a pair number of gears 15 couples the crankshaft 40a in counter rotating motion. Piston 1 is shown with pin arms 2 and piston pin boss 21a which is linked to crankpin 23 and the piston pins from the other side is linked to crankpin 25 of the other crankshaft 40b; connecting rods are not shown for clearness. The other piston is linked to crankpin 22 as well to crankpin 24; this alternated position is to maintain force over each piston perfectly centered.

Figure 5:
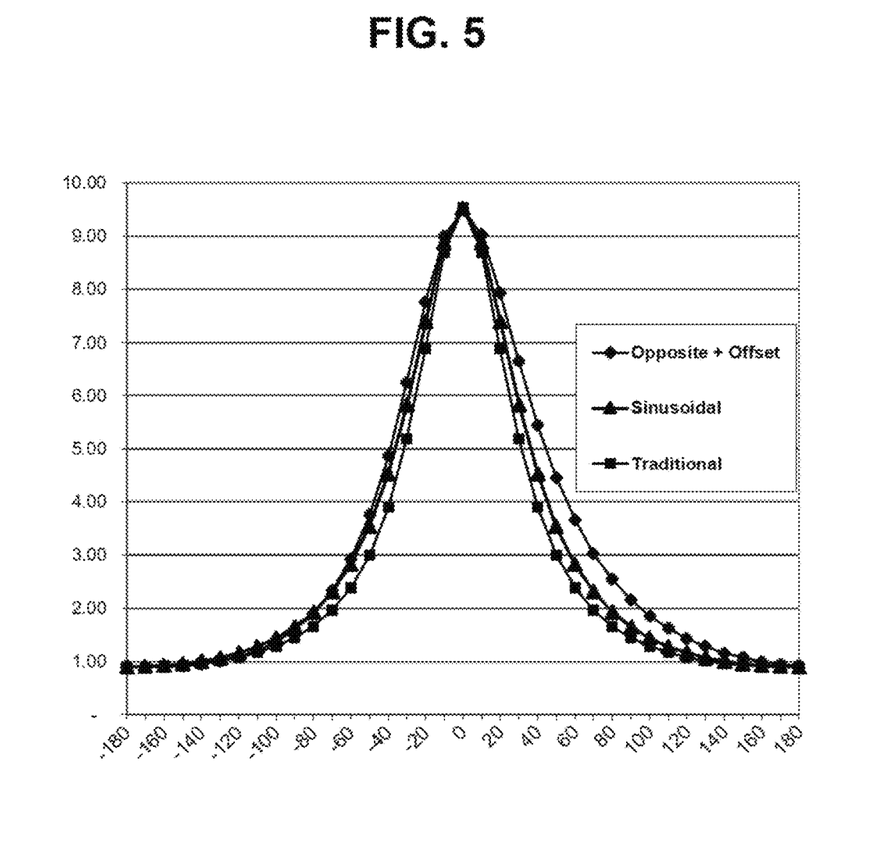

FIG. 5 is a chart of compression ratio versus crankshaft rotational angle according to an embodiment example of the present invention. The plot is done with connecting rods length having 1.5 times the magnitude of the crankshaft diameter. In the chart, a plot of Traditional connecting rods configuration provides extra time on low compression position, or BDC zone, with no important implications, meanwhile time on its TDC zone is critically reduced (narrowest graph). In the chart, the Sinusoidal plot shows symmetric time-depended displacement on the TDC zone as well on the BDC zone (intermediate graph). In the chart, the Opposite-plus-offset plot shows incremented timing at TDC zone with reduced timing at BDC zone (widest graph). In this last embodiment, connecting rods are on traction mode.

Figure 6A:
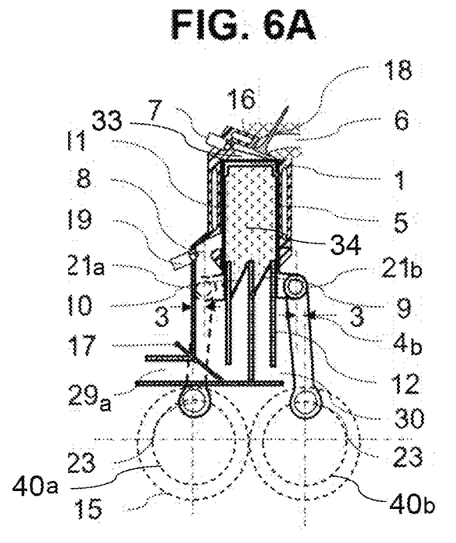

FIG. 6A is a cross-sectional view showing a single piston with gears 15 generating counter rotation on two crankshafts 40a and 40b. The piston is linked to each crankpin 23 and 25 by means of connecting rods 4a and 4b. Connecting rods are on traditional layout which is compression mode; reverse of FIG. 1. Offset 3 can be applied from linear piston pin movement and the centerline of the crankshaft 40a or 40b. Intake intake-breathing volumetric airflow 30 are introduced by means of the breathing chamber 34 which is confined by the inside surface 11 and the static sealing component 12. Income valve 9 and outgo valve 10 are in the nearest position to the breathing chamber 34. Power control valve 17, for the Otto cycle, helps lowering throttle losses besides, excess intake gases 29b can be conducted to help to scavenge exhaust gases 6 with additional oxygen for post-combustion, reducing residual contaminants. Previous to transfer port 8 is located, as an example, a fuel injection 19 for obtaining some evaporation time with additional cooling of incoming gases. As an alternative of fuel injection 19, injection of CNG compress natural fuel gas won't affect volumetric intake-breathing efficiency. Cylinder walls 5 with the cylinder head 16 and piston 1 make the combustion chamber 33. In the cylinder head, an exhaust valve 18 can be used for scavenging improvements (valve mechanism not shown). On TDC zone, a spark plug and/or fuel injector 7 is installed.

Figure 6B:
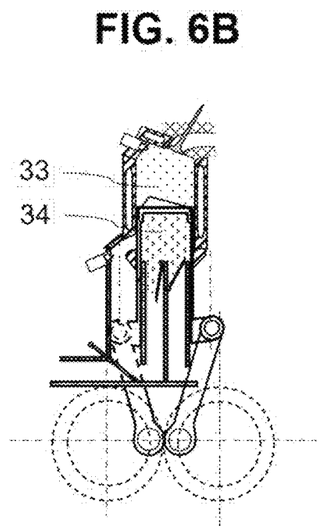
FIGS. 6B, 6C and 6D are the same cross-sectional view as FIG. 6A only crankshaft at 90-degree, 180-degree and 270-degree respectively.

FIG. 6B is the same cross-sectional view as FIG. 6A only crankshaft at 90 degree, the piston is moving downwards and breathing chamber 34 outgo valve is open.

Figure 6C:
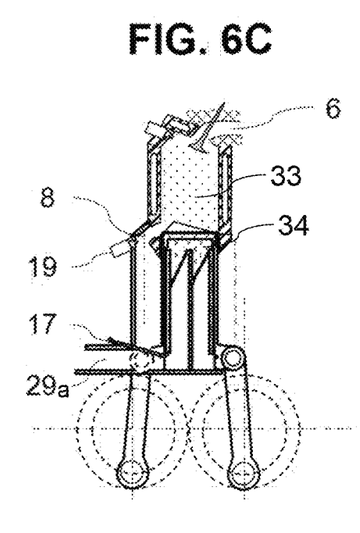

FIG. 6C is the same cross-sectional view as FIG. 6A only crankshaft at 180-degree, the piston is at BDC, exhaust gases 6 are released. The power control valve 17 derives excess intake gases 29b to the exhaust gasses 6. The portion 29a of intake-breathing volumetric airflow 30 needed are introduced to the combustion chamber 33 through transfer port 8 and injector 19 introduce fuel previous to transfer port closure.

Figure 6D:
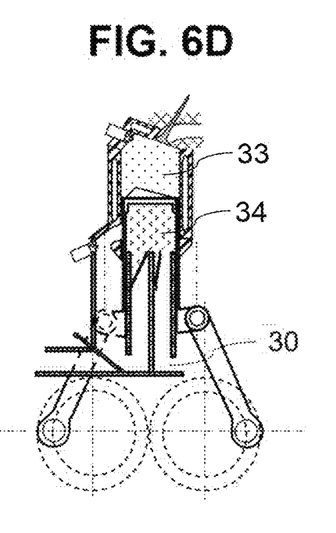

FIG. 6D is the same cross-sectional view as FIG. 6A only crankshaft at 270-degree, the piston is moving upwards and intake-breathing volumetric airflow 30 are introduced to the breathing chamber 34.

It will be apparent to one with skill in the art that the piston external pin, connecting rods on traction, and control valve of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

The invention claimed is:

1. A mechanism comprising:
   a piston having an inside surface wherein said inside surface together with a sealing component encloses a breathing chamber;
   a first and a second and piston pin bosses located outside from said breathing chamber;
   a first crankshaft having a diameter and rotating on a first direction and a second crankshaft coupled to said first crankshaft, said second crankshaft having the same diameter as the first crankshaft and rotating on the opposite direction to that of the first crankshaft; wherein said first and second crankshafts change the linear motion of said piston into rotating motion and wherein said first crankshaft comprises a first crankpin and said second crankshaft comprises a second crankpin;

a first connecting rod connecting said first piston pin boss to said first crankpin and a second connecting rod connecting said second piston pin boss to said second crankpin;

at least one transfer port;

a combustion chamber; and an income valve and an outgo valve attached to said breathing chamber forming an intake-breathing volumetric airflow due to reciprocating movement of the piston;

wherein a portion of said intake-breathing volumetric airflow enters said combustion chamber.

2. The mechanism of claim 1 wherein a portion of said intake-breathing volumetric airflow not entering said combustion chamber is mixed with exhaust gases.

3. The mechanism of claim 1 further comprising:

a second piston having a second inside surface, wherein said second piston is disposed face to face with said first piston obtaining a common combustion chamber, common exhaust transfer ports and sharing said first and second crankshafts of the first piston, and wherein said first pin boss and said second piston pin bosses are located outside from said second inside surface;

a third connecting rod connecting said second piston first pin boss to said third crankpin of said first crankshaft and a fourth connecting rod connecting said second piston second pin boss to said fourth crankpin of second crankshaft;

a second income valve and a second outgo valve attached to said common breathing chamber forming a second intake-breathing volumetric airflow due to reciprocating movement of the second piston; and a second transfer port in front of first transfer port of the first piston;

wherein a portion of said second intake-breathing volumetric airflow enters said common combustion chamber.

\* \* \* \* \*